(12) United States Patent
Pearce et al.

(10) Patent No.: US 8,447,495 B2
(45) Date of Patent: May 21, 2013

(54) METHOD AND SYSTEM FOR FUEL VAPOR CONTROL

(75) Inventors: Russell Randall Pearce, Ann Arbor, MI (US); Scott Bohr, Plymouth, MI (US); Christopher Kragh, Commerce Township, MI (US); Timothy DeBastos, Royal Oak, MI (US); Patrick Sullivan, Plymouth, MI (US); James Michael Kerns, Trenton, MI (US); Chad Michael Olson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 461 days.

(21) Appl. No.: 12/790,791

(22) Filed: May 28, 2010

(65) Prior Publication Data

US 2011/0295482 A1    Dec. 1, 2011

(51) Int. Cl.
*F02M 33/00*    (2006.01)

(52) U.S. Cl.
USPC ............ 701/103; 123/516; 123/518; 123/520

(58) Field of Classification Search
USPC .......... 123/516, 518, 519, 520, 521; 701/103, 701/107; 73/114.39
See application file for complete search history.

(56) References Cited

U.S. PATENT DOCUMENTS

| | | | |
|---|---|---|---|
| 5,220,898 A | 6/1993 | Kidokoro et al. | |
| 5,263,462 A | 11/1993 | Reddy | |
| 5,996,400 A | 12/1999 | Nishioka et al. | |
| 6,220,230 B1 | 4/2001 | Kawamura et al. | |
| 6,276,343 B1 * | 8/2001 | Kawamura et al. | 123/520 |
| 6,321,727 B1 | 11/2001 | Reddy et al. | |
| 6,412,277 B2 | 7/2002 | Hagen et al. | |
| 6,435,164 B1 | 8/2002 | Kaiser et al. | |
| 6,557,401 B2 | 5/2003 | Ito | |
| 6,557,534 B2 | 5/2003 | Robichaux et al. | |
| 6,761,154 B2 | 7/2004 | Takagi et al. | |
| 6,837,224 B2 | 1/2005 | Kidokoro et al. | |
| 6,880,534 B2 | 4/2005 | Yoshiki et al. | |
| 6,950,742 B2 | 9/2005 | Yamaguchi et al. | |
| 6,951,126 B2 | 10/2005 | Perry et al. | |
| 6,965,825 B2 | 11/2005 | Hosoya et al. | |
| 6,988,396 B2 | 1/2006 | Matsubara et al. | |
| 7,032,580 B2 | 4/2006 | Suzuki | |
| 7,036,359 B2 | 5/2006 | Hayakawa et al. | |
| 7,043,972 B2 | 5/2006 | Matsubara et al. | |
| 7,055,556 B2 | 6/2006 | Benjey et al. | |

(Continued)

OTHER PUBLICATIONS

Debastos, Timothy et al. "Method and System for Fuel Vapor Control," U.S. Appl. No. 12/790,790, filed May 28, 2010, 58 pages.

(Continued)

*Primary Examiner* — Hai Huynh
(74) *Attorney, Agent, or Firm* — Julia Voutyras; Alleman Hall McCoy Russell & Tuttle LLP

(57) ABSTRACT

A method and system for fuel vapor control in a hybrid vehicle (HEV). The HEV fuel vapor recovery system includes a fuel tank isolation valve, which is normally closed to isolate storage of refueling from storage of diurnal vapors. The method for fuel vapor control includes selectively actuating the fuel tank isolation valve during interrelated routines for refueling, fuel vapor purging, and emission system leak detection diagnostics to improve regulation of pressure and vacuum the HEV fuel vapor recovery system.

21 Claims, 10 Drawing Sheets

U.S. PATENT DOCUMENTS

| | | |
|---|---|---|
| 7,073,376 B2 | 7/2006 | Hassdenteufel et al. |
| 7,077,112 B2 | 7/2006 | Mitani et al. |
| 7,086,392 B2 | 8/2006 | Suzuki |
| 7,152,587 B2 | 12/2006 | Suzuki |
| 7,174,883 B2 | 2/2007 | Sonoda et al. |
| 7,204,239 B2 | 4/2007 | Iriyama |
| 7,347,191 B2 | 3/2008 | Atwood et al. |
| 7,472,582 B2 | 1/2009 | Ito et al. |
| 8,019,525 B2 * | 9/2011 | DeBastos et al. ............. 701/102 |
| 8,056,540 B2 * | 11/2011 | DeBastos et al. ............. 123/521 |
| 8,200,411 B2 * | 6/2012 | DeBastos et al. ............. 701/102 |
| 8,215,291 B2 * | 7/2012 | DeBastos et al. ............. 123/521 |
| 2007/0068227 A1 | 3/2007 | Tsuyuki et al. |
| 2011/0265768 A1 * | 11/2011 | Kerns et al. ................... 123/521 |
| 2012/0145133 A1 * | 6/2012 | Takamatsu .................... 123/520 |

OTHER PUBLICATIONS

Debastos, Timothy et al. "Method and System for Fuel Vapor Control," U.S. Appl. No. 12/790,792, filed May 28, 2010, 58 pages.

* cited by examiner

METHOD AND SYSTEM FOR FUEL VAPOR CONTROL

FIELD

The present application relates to fuel vapor purging in a hybrid vehicle.

BACKGROUND AND SUMMARY

Hybrid vehicles, such as plug-in hybrid vehicles, may have two modes of operation: an engine-off mode and an engine-on mode. While in the engine-off mode, power to operate the vehicle may be supplied by stored electrical energy. While in the engine-on mode, the vehicle may operate using engine power. By switching between electrical and engine power sources, engine operation times may be reduced, thereby reducing overall carbon emissions from the vehicle. However, shorter engine operation times may lead to insufficient purging of fuel vapors from the vehicle's emission control system. Additionally, refueling and emission control system leak detection operations that are dependent on pressures and vacuums generated during engine operation may also be affected by the shorter engine operation times in hybrid vehicles.

Various strategies have been developed to address fuel vapor control and management in hybrid vehicle systems. Example approaches include separating storage of refueling vapors from storage of diurnal vapors by adding a fuel tank isolation valve (FTIV) between a fuel tank and a fuel vapor retaining canister, and allowing refueling vapor purging to the canister during refueling events, and engine-on purging methods. The separation of diurnal and refueling vapors allows a pressure to be generated in the fuel tank, while application of alternative vacuum sources allows a vacuum to be generated in the canister.

One example approach for fuel vapor management is shown by Suzuki et al. in U.S. Pat. No. 7,032,580 B2. Therein, a control system determines if the fuel tank pressure is above a predetermined value while a purging from the carbon canister to the engine intake is occurring. If the fuel tank pressure is greater than the predetermined value, a pressure control valve between the fuel tank and the carbon canister is opened to permit purging of fuel vapors from the fuel tank. Opening of an exhaust gas recirculation valve is adjusted based on the opening of the pressure control valve to decrease an amount of fuel injected to the engine and suppress fluctuation of the air-fuel ratio. The pressure control valve is closed after a duration, based on pressure in the fuel tank and the purge flow rate, has elapsed.

However, the inventors herein have recognized potential issues with this approach. As one example, under conditions where the average fuel tank pressure is very high, such as in hybrid vehicle fuel systems, the pressure valve may open more frequently, or for longer durations, leading to more frequent engine air-fuel ratio fluctuations. For example, if the fuel tank is normally sealed from the canister, the ambient temperature is high, and the hybrid vehicle has been operated in the engine-off mode for a long duration, the fuel tank pressure may be significantly higher than that of the carbon canister. As a result, controlled release of fuel vapors from the fuel tank, to dissipate the fuel tank pressure, while the canister purge valve is open may be difficult to achieve, and flooding of the engine with excessive vapors may occur. Such flooding may lead to engine stumbles and stalls, and degrade engine performance.

The above issue may be at least partly addressed by a method that allows for coordination of purging fuel vapors from the fuel tank with purging of fuel vapors from the canister, by regulating opening of a FTIV, to maintain a canister pressure and a fuel tank pressure, without flooding the engine. In one embodiment, the method includes, operating a fuel vapor recovery system coupled to an engine intake, the fuel vapor recovery system including a fuel tank coupled to a canister through a first valve, the canister coupled to the engine intake through a second valve, the canister further coupled to a vacuum accumulator. The method may comprise, during a purging condition, purging a first amount of fuel vapors from the canister to the engine intake; and after purging the first amount, purging a second amount of fuel vapors from the fuel tank to the canister, the second amount adjusted based on the first amount.

In one example, a fuel vapor recovery system for a hybrid vehicle may comprise a fuel tank coupled to a canister via a fuel tank isolation valve (FTIV). The canister may be coupled to the engine intake via a canister purge valve (CPV). The canister may be further coupled to a vacuum accumulator via a vacuum accumulator valve (VAV). As such, the FTIV may be maintained closed during vehicle operation and may be selectively opened during refueling and diurnal purging conditions. By maintaining the FTIV closed, the fuel vapor circuit may be divided into a canister side and a fuel tank side. Refueling vapors may be retained in the canister on the canister side of the circuit while diurnal vapors may be retained in the fuel tank on the fuel tank side of the circuit.

A first pressure sensor may be coupled to the fuel tank to estimate a pressure of the fuel tank side of the circuit, while a second pressure sensor may be coupled to the carbon canister to estimate a pressure of the canister side of the circuit. Based on input from various sensors, such as the pressure sensors, and further based on vehicle operating conditions, a controller may adjust various actuators, such as the CPV, the FTIV, and a canister vent valve (CVV), to enable fuel tank refueling, purging of stored fuel vapors, and leak detection in the fuel vapor recovery system.

In one example, the controller may determine purging conditions are met when the canister pressure is above a first predetermined threshold while the vehicle is operated in an engine-on mode. The controller may then open the CPV to purge refueling vapors stored in the carbon canister to the engine intake. Once the carbon canister pressure has fallen below the first threshold, the CPV may be closed and the controller may determine if a fuel tank pressure is above a second predetermined threshold. The controller may accordingly open the FTIV to purge diurnal vapors stored in the fuel tank to the carbon canister. The duration of opening of the FTIV may be determined as a function of the canister pressure, so that the controller may close the FTIV as the pressure of the canister approaches the first threshold.

In such an approach, operation of the FTIV may be tightly regulated during purging to maintain a pressure in the carbon canister that is below the first threshold for purging and prevent flooding of the engine during a purging operation. Additionally, regulated bleeding of fuel vapors from the fuel tank may partially curb the high pressure fluctuations experienced in the fuel tank. Further, the present approach may allow fuel tank and canister pressures to equilibrate faster. As such, fuel tank refueling may be unsafe when fuel tank pressures are high. Thus, by equilibrating fuel tank and canister pressures faster, purging may be better coordinated with refueling operations, for example, by reducing a delay time between receiving a refueling request event and opening of a fuel tank door, after fuel tank pressure dissipation, to receive fuel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
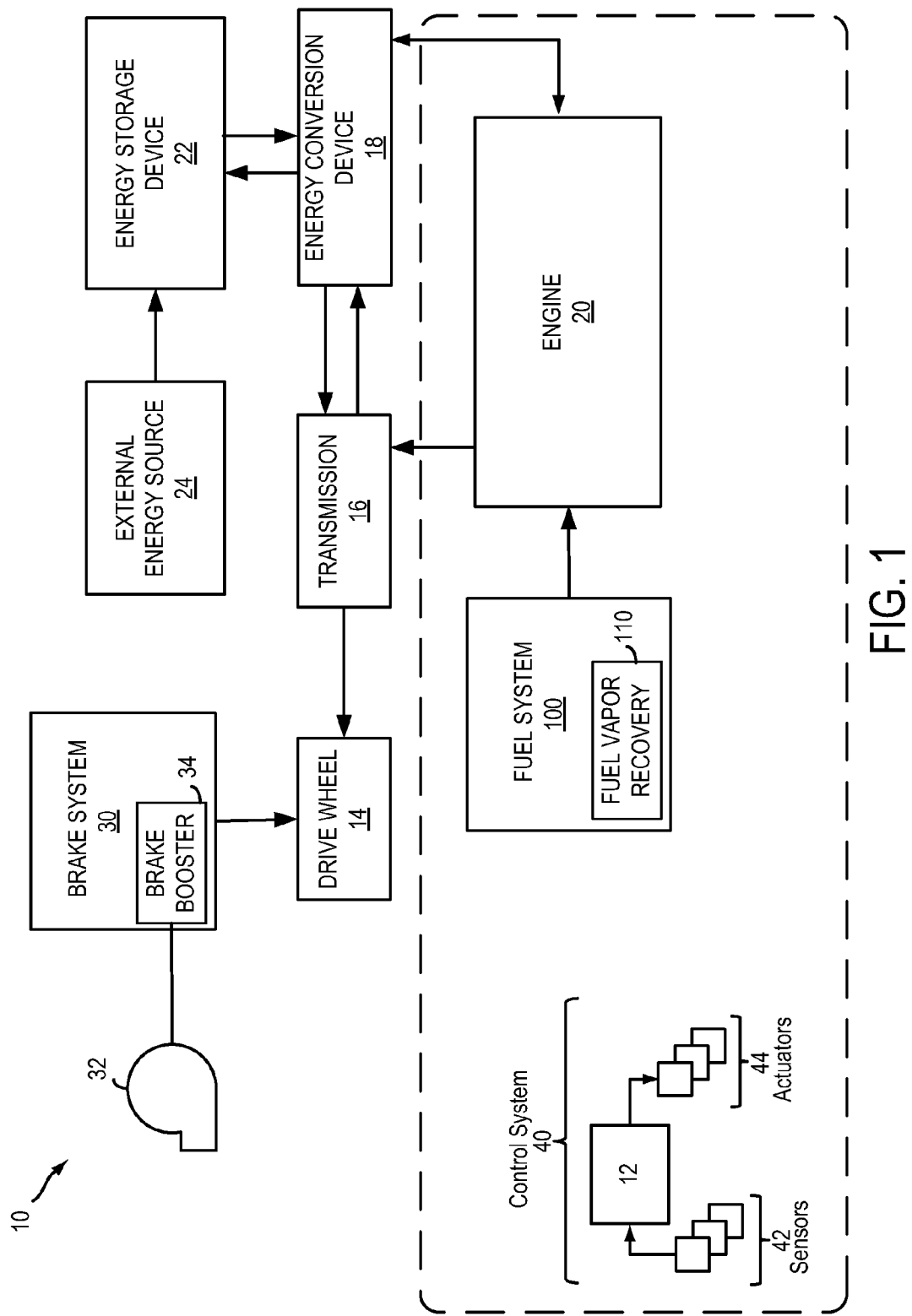
FIG. 1 shows a schematic depiction of a hybrid vehicle.
Figure 2:
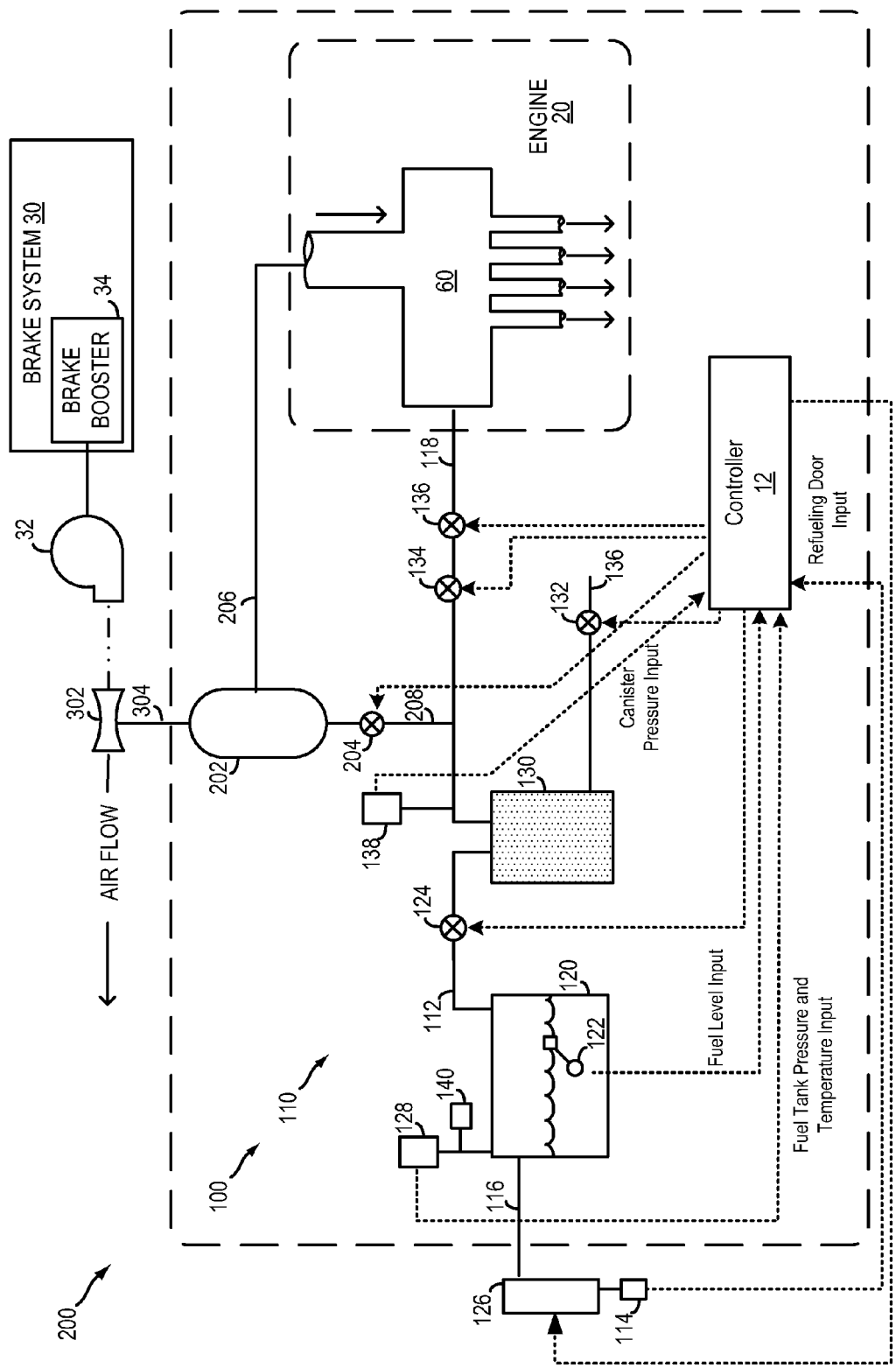
FIG. 2 shows an example embodiment of the fuel system and fuel vapor recovery system of FIG. 1.

The following description relates to a fuel vapor recovery system for a hybrid vehicle, such as the vehicle system of FIG. 1, and a method of monitoring flow of fuel vapors and/or air though the fuel vapor recovery system. As shown in FIG. 2, the fuel vapor recovery system may include a fuel tank isolated from a canister by a fuel tank isolation valve (FTIV), the canister further coupled to an engine intake by a canister purge valve (CPV). In this way, refueling vapors may be stored in the canister while diurnal vapors are retained in the fuel tank, dividing the fuel vapor circuit into a canister side and a fuel tank side. A vacuum accumulator may be included in the fuel vapor recovery system to provide a vacuum source to the canister. The vacuum accumulator may be configured to generate and store vacuum during engine-on conditions and engine-off conditions, such as from the engine and/or from a brake booster pump. A controller may receive signals from various sensors including pressure, temperature, fuel level, and refueling door position sensors, and accordingly regulate actuators, including various valves of the fuel vapor recovery system, by performing various routines during vehicle operation, such as refueling, fuel vapor purging, and leak detection, as shown in FIGS. 3-8. Example changes in system pressures and temperatures, as detected by various sensors in the fuel vapor recovery system, are depicted in the maps of FIGS. 9-12. By applying inter-related strategies, engine-on and engine-off vehicle operations, refueling, fuel vapor purging, and leak detection operations may be better coordinated, thereby improving fuel vapor management in hybrid vehicles.

Referring to FIG. 1, the figure schematically depicts a vehicle with a hybrid propulsion system 10. Hybrid propulsion system 10 includes an internal combustion engine 20 coupled to transmission 16. Transmission 16 may be a manual transmission, automatic transmission, or combinations thereof. Further, various additional components may be included, such as a torque converter, and/or other gears such as a final drive unit, etc. Transmission 16 is shown coupled to drive wheel 14, which may contact a road surface.

In this example embodiment, the hybrid propulsion system also includes an energy conversion device 18, which may include a motor, a generator, among others and combinations thereof. The energy conversion device 18 is further shown coupled to an energy storage device 22, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (in other words, provide a generator operation). The energy conversion device may also be operated to supply an output (power, work, torque, speed, etc.) to the drive wheel 14 and/or engine 20 (in other words, provide a motor operation). It should be appreciated that the energy conversion device may, in some embodiments, include a motor, a generator, or both a motor and generator, among various other components used for providing the appropriate conversion of energy between the energy storage device and the vehicle drive wheels and/or engine.

The depicted connections between engine 20, energy conversion device 18, transmission 16, and drive wheel 14 may indicate transmission of mechanical energy from one component to another, whereas the connections between the energy conversion device 18 and the energy storage device 22 may indicate transmission of a variety of energy forms such as electrical, mechanical, etc. For example, torque may be transmitted from engine 20 to drive the vehicle drive wheel 14 via transmission 16. As described above energy storage device 22 may be configured to operate in a generator mode and/or a motor mode. In a generator mode, system 10 may absorb some or all of the output from engine 20 and/or transmission 16, which may reduce the amount of drive output delivered to the drive wheel 14, or the amount of braking torque from brake system 30, which includes brake booster 34 and brake booster pump 32, to the drive wheel 14. Such operations may be employed, for example, to achieve efficiency gains through regenerative braking, increased engine efficiency, etc. Further, the output received by the energy conversion device may be used to charge energy storage device 22. Alternatively, energy storage device 22 may receive electrical charge from an external energy source 24, such as a plug-in to a main electrical supply. In motor mode, the energy conversion device may supply mechanical output to engine 20 and/or transmission 16, for example by using electrical energy stored in an electric battery.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

From the above, it should be understood that the exemplary hybrid propulsion system is capable of various modes of operation. For example, in a first mode, engine 20 is turned on and acts as the torque source powering drive wheel 14. In this case, the vehicle is operated in an "engine-on" mode and fuel is supplied to engine 20 from fuel system 100 (depicted in further detail in FIG. 2). Fuel system 100 includes a fuel vapor recovery system 110 to store fuel vapors and reduce emissions from the hybrid vehicle propulsion system 10.

In another mode, the propulsion system may operate using energy conversion device 18 (e.g., an electric motor) as the torque source propelling the vehicle. This "engine-off" mode of operation may be employed during braking, low speeds, while stopped at traffic lights, etc. In still another mode, which may be referred to as an "assist" mode, an alternate torque source may supplement and act in cooperation with the torque provided by engine 20. As indicated above, energy conversion device 18 may also operate in a generator mode, in which torque is absorbed from engine 20 and/or transmission 16. Furthermore, energy conversion device 18 may act to augment or absorb torque during transitions of engine 20 between different combustion modes (e.g., during transitions between a spark ignition mode and a compression ignition mode).

The various components described above with reference to FIG. 1 may be controlled by a vehicle control system 40, which includes a controller 12 with computer readable instructions for carrying out routines and subroutines for regulating vehicle systems, a plurality of sensors 42, and a plurality of actuators 44. Select examples of the plurality of sensors 42 and the plurality of actuators 44 are described in further detail below, in the description of fuel system 100.

FIG. 2 shows an example embodiment 200 of the fuel system 100 and fuel vapor recovery system 110 of FIG. 1. Engine 20, coupled to a fuel system 100, may include a plurality of cylinders (not shown). Engine 20 may receive intake air through intake manifold 60 which may lead to an exhaust passage (not shown) that routes exhaust gas to the atmosphere (as indicated by arrows). It will be appreciated that the engine intake and exhaust manifolds may be additionally coupled to an emission control device and/or a boosting device.

Fuel system 100 may include a fuel tank 120 coupled to a fuel pump system for pressurizing fuel delivered to the injectors of engine 20 (not shown). It will be appreciated that fuel system 100 may be a return-less fuel system, a return fuel system, or various other types of fuel system. Vapors generated in fuel system 100 may be routed to a fuel vapor recovery system 110 via a first conduit, vapor line 112, before being purged to intake manifold 60 via a second conduit, purge line 118.

The fuel tank 120 may hold a plurality of fuel blends, including fuel with a range of alcohol concentrations, such as various gasoline-ethanol blends, including E10, E85, gasoline, etc., and combinations thereof. As depicted in FIG. 2, fuel tank 120 includes a fuel level sensor 122 which may comprise a float connected to a variable resistor. Alternatively, other types of fuel level sensors may be used. Fuel level sensor 122 sends fuel level input signals to controller 12.

Fuel tank 120 also includes a refueling line 116, which is a passageway between the refueling door 126, which includes a refueling valve (not shown) on the outer body of the vehicle and the fuel tank, wherein fuel may be pumped into the vehicle from an external source during a refueling event. Refueling door sensor 114 coupled to refueling door 126 may be a position sensor and send input signals of a refueling door open or closed state to controller 12. Refueling line 116 and vapor line 112 may each be coupled to an opening in fuel tank 120; therein fuel tank 120 has at least two openings.

As noted above, vapor line 112 is coupled to the fuel tank for routing of fuel vapors to a fuel vapor canister 130 of the fuel vapor recovery system 110. It will be appreciated that fuel vapor recovery system 110 may include one or more fuel vapor retaining devices, such as one or more of a fuel vapor canister 130. Canister 130 may be filled with an adsorbent capable of binding large quantities of vaporized hydrocarbons (HCs). In one example, the adsorbent used is activated charcoal.

Canister 130 may receive fuel vapors from fuel tank 120 through vapor line 112, as vapor line 112 is connected at an opposing end to an opening in canister 130. Canister 130 includes two additional openings, wherein a vent 136 and a purge line 118 are coupled, such that canister 130 has three openings. While the depicted example shows a single canister, it will be appreciated that in alternate embodiments, a plurality of such canisters may be connected together.

Opening of vapor line 112 is regulated by a fuel tank isolation valve (FTIV) 124. In an alternate embodiment FTIV 124 may be mounted directly to fuel tank 120 at the attachment point of vapor line 112. As such, during vehicle operation, FTIV 124 may be maintained in a closed state, such that refueling vapors may be stored in the canister on the canister side of the fuel vapor circuit and diurnal vapors may be retained in the fuel tank on the fuel tank side of the fuel vapor circuit. FTIV 124 may be operated on by controller 12 in response to a refueling request or an indication of purging conditions. In these instances, FTIV 124 may be opened to allow diurnal vapors to enter the canister and relieve pressure in the fuel tank. Additionally, FTIV 124 may be operated on controller 12 to perform specific steps of leak detection, such as applying a pressure (positive pressure or vacuum) from fuel tank 120 to canister 130 during a first leak detection condition, or applying a vacuum from canister 130 to fuel tank 120 during a second leak detection condition (described in further detail in FIGS. 6-8). In one example, FTIV 124 may be a solenoid valve and operation of FTIV 124 may be regulated by the controller by adjusting a duty cycle of the dedicated solenoid (not shown).

A first fuel tank pressure sensor, such as a fuel tank pressure transducer (FTPT) 128, may be coupled to fuel tank 120 to provide an estimate of a fuel tank pressure. For example, FTPT 128 may be included in the top portion of fuel tank 120. In an alternate embodiment, FTPT 128 may be coupled to vapor line 112 on the fuel tank side of the fuel vapor circuit. Additionally, fuel tank 120 may include a temperature sensor 140 to provide an estimate of a fuel tank temperature. Temperature sensor 140 may be coupled to FTPT 128, as depicted in FIG. 2. In an alternate embodiment, temperature sensor 140 may be coupled to the fuel tank in a distinct location from FTPT 128. Each of pressure ($P_{FT}$) and temperature ($T_{FT}$) signals from FTPT 128 and temperature sensor 140, respectively, are received by controller 12.

Fuel vapor recovery system 110 may communicate with the atmosphere through vent 136, extending from canister 130. Canister vent valve (CVV) 132 may be located along vent 136, coupled between canister 130 and the atmosphere, and may adjust flow of air and vapors between fuel vapor recovery system 110 and the atmosphere. Operation of the CVV 132 may be regulated by a canister vent solenoid (not shown). Based on whether the fuel vapor recovery system is to be sealed or not sealed from the atmosphere, the CVV may be closed or opened. Specifically, controller 12 may energize the canister vent solenoid to close CVV 132 and seal the system from the atmosphere, such as during leak detection conditions.

In contrast, when the canister vent solenoid is at rest, the CVV 132 may be opened and the system may be open to the atmosphere, such as during purging conditions. Further still, controller 12 may be configured to adjust the duty cycle of the canister vent solenoid to thereby adjust the pressure at which CVV 132 is relieved. In one example, during a refueling vapor storing operation (for example, during a fuel tank refilling and/or while the engine is not running), the canister vent solenoid may be de-energized and the CVV may be opened so that air, stripped of fuel vapor after having passed through the canister, can be pushed out to the atmosphere. In another example, during a purging operation (for example, during a canister regeneration and while the engine is running), the canister vent solenoid may be de-energized and the CVV may be opened to allow a flow of fresh air to strip the stored vapors of the activated charcoal. Additionally, controller 12 may command CVV 132 to be intermittently closed, by adjusting operation of the canister vent solenoid, to diagnose reverse flow through the fuel vapor recovery system. In yet another example, during leak detection, the canister vent solenoid may be energized to close CVV 132, while CPV 134 and FTIV 124 are also closed, such that the canister side of fuel vapor recovery circuit is isolated. In this way, by commanding the CVV to be closed, the controller may seal the fuel vapor recovery system from the atmosphere.

Fuel vapors released from canister 130, for example during a purging operation, may be directed into intake manifold 60 via purge line 118. The flow of vapors along purge line 118 may be regulated by canister purge valve (CPV) 134, coupled between the fuel vapor canister and the engine intake. In one example, CPV 134 may be a ball check valve, although alternative check valves may also be used. The quantity and rate of vapors released by the CPV may be determined by the duty cycle of an associated solenoid (not shown). As such, the duty cycle of the canister purge valve solenoid may be determined by the vehicle's powertrain control module (PCM), such as controller 12, responsive to engine operating conditions, including, for example, an air-fuel ratio. By commanding the canister purge valve to be closed, the controller may seal the fuel vapor recovery system from the engine intake.

An optional canister check valve 136 may also be included in purge line 118 to prevent intake manifold pressure from flowing gases in the opposite direction of the purge flow. As such, the check valve may be necessary if the canister purge valve control is not accurately timed or the canister purge valve itself can be forced open by a high intake manifold pressure (such as, during boosted conditions). An estimate of the manifold absolute pressure (MAP) may be obtained from a MAP sensor (not shown) coupled to engine intake manifold 60, and communicated with controller 12. As such, check valve 136 may only permit the unidirectional flow of air from canister 130 to intake manifold 60. In the event of high pressure air entering the purge line from intake manifold 60, canister check valve 136 may close, thereby preventing the pressure in canister 130 from exceeding design limits. While the depicted example shows the canister check valve positioned between the canister purge valve and the intake manifold, in alternate embodiments, the check valve may be positioned before the purge valve. A second canister pressure sensor, such as canister pressure transducer (CPT) 138, may be included in purge line 118, coupled between canister 130 and CPV 134 to provide an estimate of a canister pressure. In alternate embodiments the CPT may be coupled to the vent between the canister and the CVV, or may be coupled to the vapor line between the canister and the fuel tank on the canister side of the fuel vapor circuit. Signals indicating canister pressure (Pc) are received by controller 12.

Fuel vapor recovery system 110 also includes vacuum accumulator 202 coupled to fuel vapor canister 130. In one example, vacuum accumulator 202 may be coupled through vacuum line 208 to purge line 118, between canister 130 and the CPV 134. In other example embodiments, the vacuum line may be coupled to the vapor line between the canister and the FTIV. Application of vacuum from the vacuum accumulator to the canister through vacuum line 208 is regulated by opening or closing vacuum accumulator valve (VAV) 204, as commanded by controller 12. VAV 204 may be selectively opened by controller 12 during emission leak detection operations, such as when insufficient engine-off natural vacuum is available, to provide additional vacuum for leak detection. For example, VAV 204 may be selectively opened during a secondary leak detection subroutine implemented under a condition wherein the absolute pressure of the fuel tank is less than a threshold, as further elaborated in FIG. 9.

In one embodiment, vacuum accumulator 202 may be coupled to intake manifold 60 through conduit 206, and may accumulate vacuum when the hybrid vehicle is operated in the engine-on mode. That is, the accumulator may store an amount of engine vacuum for later use. Additionally, or optionally, a venturi 302 may be coupled to vacuum accumulator 202 by venturi vacuum line 304. The venturi may be mounted at various locations on the body of the hybrid vehicle that receive air or exhaust flow during vehicle motion and operation. For example, the venturi may be mounted on the underside of the vehicle body. In another example, venturi 302 may be coupled to the exhaust manifold, for example along the tailpipe, such that vacuum may be generated due to the flow of exhaust through the venturi. In yet another example, as depicted, venturi 302 may be mounted in the exhaust pathway of a brake booster pump 32 coupled to a brake booster 34 of the vehicle brake system 30. Herein, during brake application, vacuum may be generated due to operation of the brake booster pump and flow of brake booster pump exhaust through the venturi. In one example, by coupling the venturi to the exhaust pathway of the brake booster pump, rather than directly coupling the vacuum accumulator to the brake booster pump, the brake booster pump may not be exposed to fuel vapors. In still other embodiments, vacuum accumulator 202 may be directly coupled to brake booster pump 32, wherein vacuum may be generated by operating the brake pump, and stored in the vacuum accumulator for use in leak detection routines.

Figure 3:
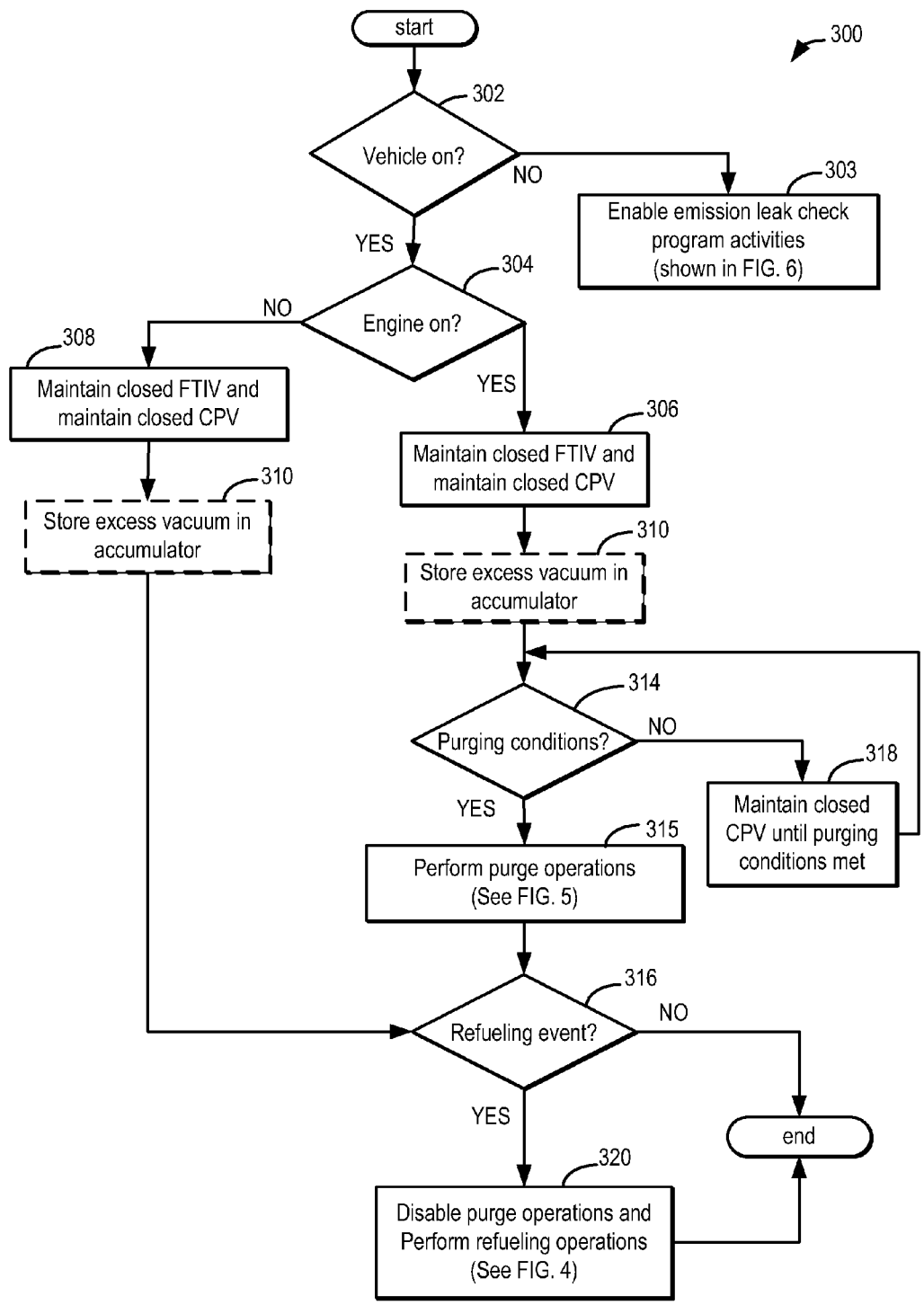
FIG. 3 shows a high level flow chart for operating the fuel vapor recovery system of FIG. 2.

Controller 12 may be configured to regulate various operations of the fuel vapor recovery system by receiving signals from sensors, such as pressure, temperature, and position sensors, and commanding on actuators, such as opening and closing of valves or the refueling door. For example, controller 12 may carry out various routines for leak detection, refueling, and fuel vapor purging, as shown in FIGS. 4-8. Specifically, the various routines for the fuel vapor recovery system may be better coordinated by controller 12, for example, by performing a higher-level vapor recovery system routine, as shown in FIG. 3, which may strategically implement each of the various routines depending on the operating conditions of the vehicle, such as engine-on or engine-off operations, and pressure and temperature inputs from sensors. For example, if a refueling routine is implemented, controller 12 may disable a purging routine.

An example higher-level vapor recovery system routine 300 is depicted in FIG. 3. Herein, at 302 it may be determined whether the vehicle is on or off, that is, whether or not the vehicle is operational. In one example, this may be detected by a key command sensor and/or motion sensor for the vehicle (not shown). If the vehicle is not being operated, the controller 12 may enable a leak detection routine at 303, described further in FIG. 6. Leak detection may additionally be regulated by other factors recorded by the controller, such as time elapsed since a last leak detection routine occurred. In alternate embodiments, leak detection methods may be implemented while the vehicle is on, but in an engine-off mode of operation.

If the controller receives a signal that the vehicle is on, at 304 it is determined if the vehicle is in an engine-on mode or an engine-off mode. If the vehicle is operating in an engine-off mode, the controller may implement the commands shown at 308. Specifically, the controller may maintain a closed state for each of the FTIV and the CPV. That is, diurnal vapors may be stored in the fuel tank while refueling vapors may are stored in the canister. Additionally, purging routines may be limited for the duration of the engine-off mode of operation. Optionally at 310, during the engine-off mode of operation, vacuum may be stored in the vacuum accumulator. Specifically, the controller may maintain the VAV closed while vacuum is generated at the venturi coupled to the vacuum accumulator. As previously elaborated, vacuum may be generated due to flow of air and/or exhaust through the venturi irrespective on engine operation mode, such as due to flow of ambient air during vehicle motion or exhaust flow from the brake booster pump.

If the vehicle is operating in an engine-on mode at 304, then at 306, the FTIV and CPV may be maintained in closed positions. At 310, the controller may maintains the VAV closed while accumulating vacuum due to flow of air and/or exhaust through the coupled venturi. As such, in addition to the vacuum accumulation strategies described above, vacuum may also be generated by coupling the vacuum accumulator to the engine intake manifold.

Next, at 314, purging conditions may be confirmed. Purging conditions may include detection of engine-on operations, a signal from the CPT that the canister pressure is above a predetermined threshold (such as, $threshold_2$ of FIG. 5), and/or a signal from the FTPT that the fuel tank pressure is above a threshold (such as, $threshold_3$ of FIG. 5). If purging conditions are confirmed, a purging routine (further depicted in FIG. 5) may be commanded at 315. If purging conditions are not met, at 318, the controller may maintain the closed positions of the FTIV and the CPV.

At 316, independent of the vehicle operation mode, it may be determined if a fuel tank refueling is requested by the user. If no refueling request is received, the routine may end. In one example, a refueling request may be determined by the controller based on user input through a button, lever, and/or voice command. In response to a refueling request, a refueling routine (further depicted in FIG. 4) may be implemented at 320. However, if the refueling request is received during a purging operation (such as, while purging operations of step 315 are being performed), at 320, the purging routine may be temporarily disabled for the duration of the refueling event, for example, by temporarily commanding the CPV closed. With this, the routine may end.

In this way, purging and refueling operations may be better coordinated so as to enable refueling only when fuel tank pressures are within a safe range, while staggering purging operations with refueling so as to reduce excess refueling fuel vapor flow into the engine intake.

Figure 4:
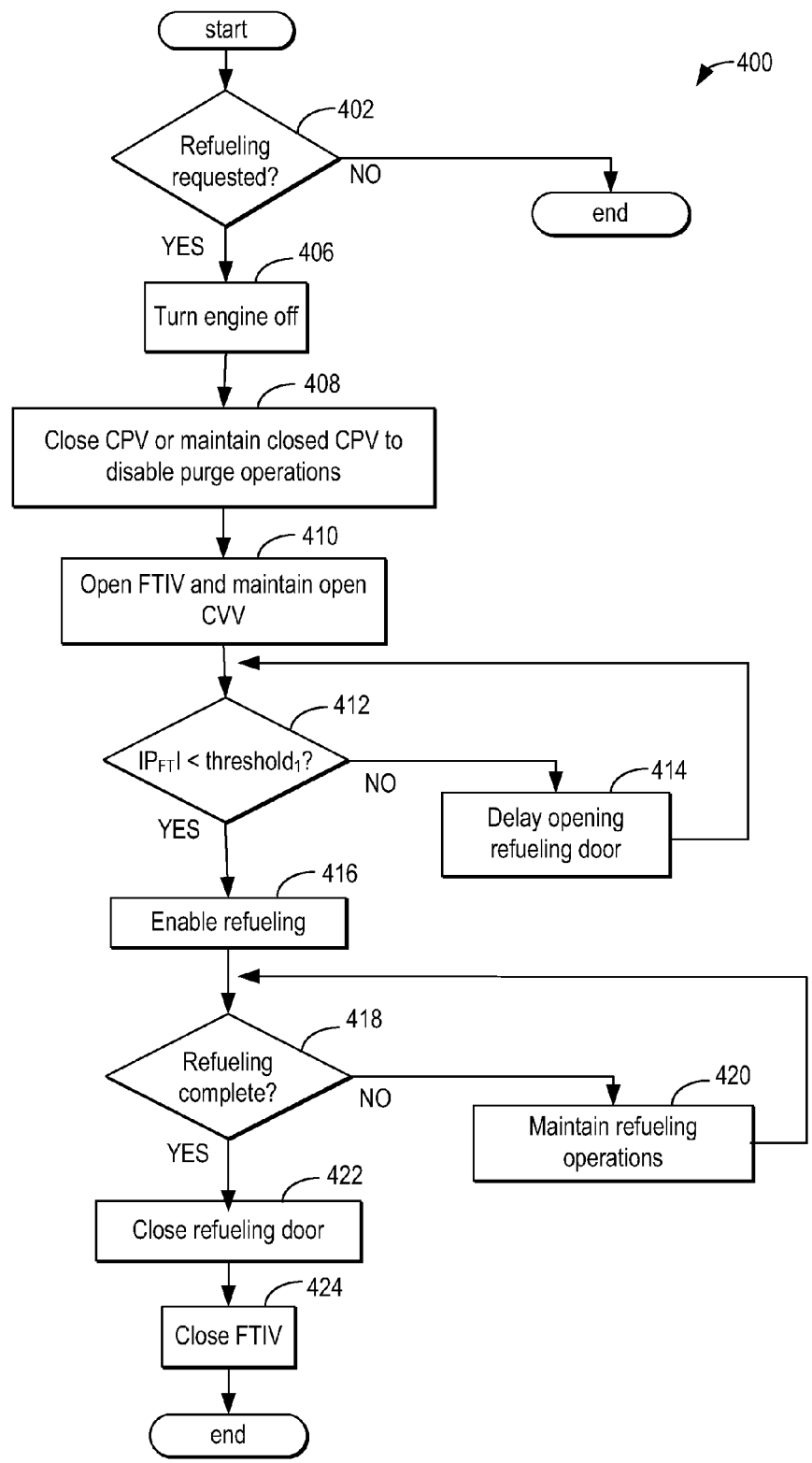
FIG. 4 shows a high level flow chart for operating the fuel vapor recovery system during a refueling event.

Now turning to FIG. 4, a refueling routine 400 is shown. At 402, a user refueling request may be confirmed by the controller. In response to the refueling request, the controller may disable engine operations at 406. At 408, purging operations may be disabled, for example, by (temporarily) maintaining the CPV in a closed position. At 410, the FTIV may be opened and the CVV may be maintained open. Herein, by opening the vapor line between the fuel tank side and the canister side of the fuel vapor circuit, pressure in the fuel tank may be relieved. For example, if a high pressure exists in the fuel tank, air and fuel vapors may flow from the fuel tank through the vapor line and into the canister. In another example, if a vacuum exists in the fuel tank, air may flow from the canister through the vapor line and into the fuel tank. In both examples, pressures of the fuel tank and the canister may go toward equilibrium, such that the fuel tank may be safely and easily opened.

At 412, it may be determined whether the absolute value of the fuel tank pressure is below a predetermined threshold ($threshold_1$). If so, at 416, refueling may be enabled. If the absolute value of the fuel tank pressure is greater than $threshold_1$, the controller may delay opening of the refueling door in command 414, until the fuel tank pressure falls below $threshold_1$. The controller may enable refueling by commanding a refueling door to open, for example, by de-energizing a solenoid in the refueling door to enable door opening. The vehicle operator may then have access to the refueling line and fuel may be pumped from an external source into the fuel tank until refueling is determined to be complete at 418.

Because the FTIV may remain open during the refueling operation, refueling vapors may flow through the vapor line and into the carbon canister for storage. Until refueling is complete, refueling operations may be maintained at 420. If refueling is completed at 418, for example based on input from the fuel level sensor, the refueling door may be closed at 422, for example by energizing the refueling door solenoid. In response to refueling door closing, at 424, the FTIV may be closed in thereby ensuring that refueling vapors are stored in the canister side of the fuel vapor circuit. Therein, the refueling routine may be concluded. In this way, refueling may be enabled only when fuel tank pressures are within a safe range, and improving coordination of refueling with purging.

Figure 5:
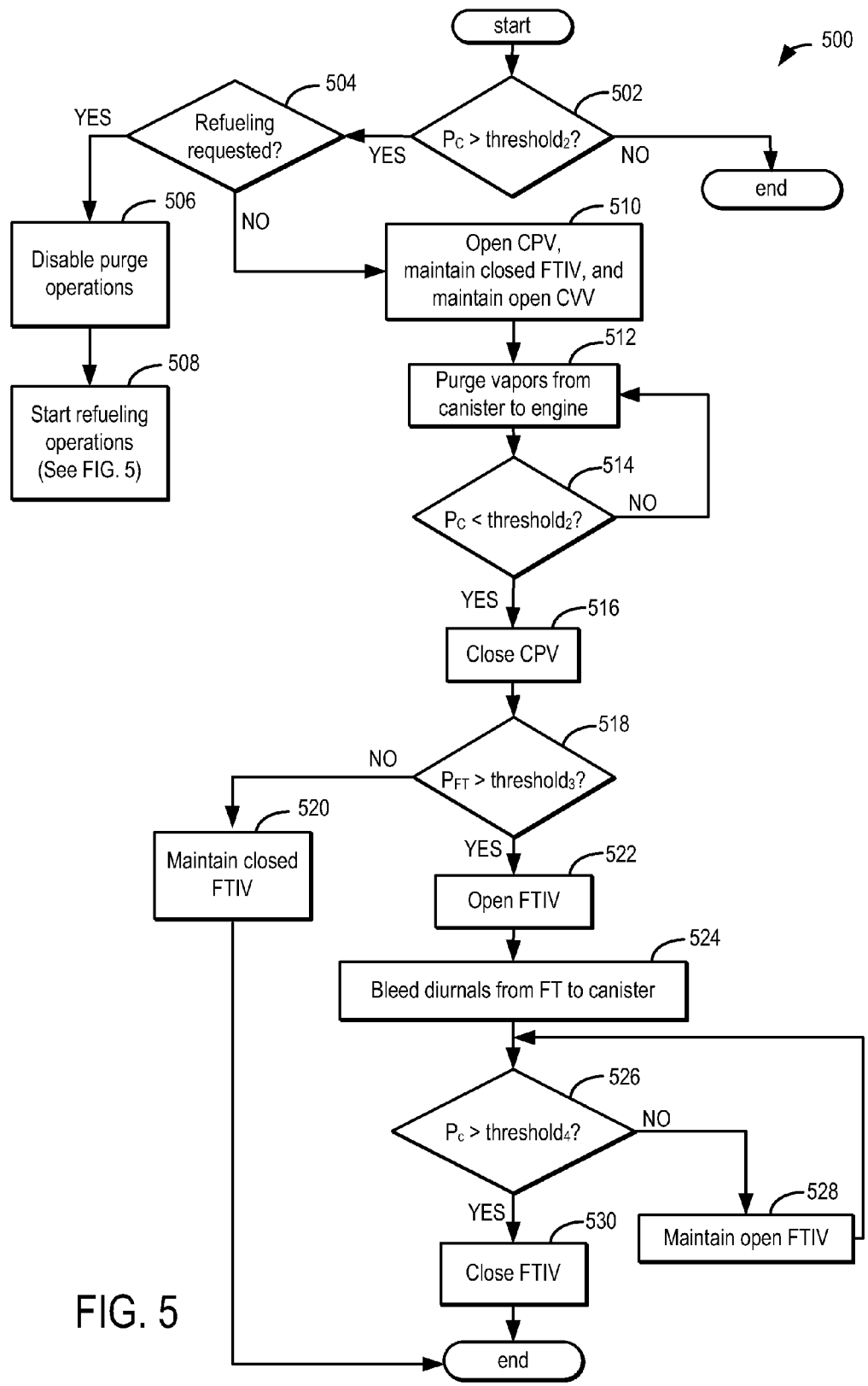
FIG. 5 shows a high level flow chart for operating the fuel vapor recovery system during a purging event.

Now turning to FIG. 5, a purging routine 500 is depicted. Purging routine 500 may be enabled in response to purging conditions being met (at 314 of FIG. 3), such as when the vehicle is operated in an engine-on mode and a refueling event is not requested. At 502, while the vehicle is operated in the engine-on mode, it may be determined if a canister pressure (Pc), for example as estimated by the CPT, is above a predetermined threshold for purging ($threshold_2$). If the canister pressure is above the threshold, and a refueling request is received at 504, then at 506, purging operations may be disabled at least for the duration of refueling, and refueling operations (FIG. 4) may be enabled at 508. Specifically, CPV may be maintained closed for the duration of the refueling event.

If the canister pressure is above the threshold, and no refueling request is received at 504, then at 510, the controller may command the CPV to open while maintaining the FTIV closed and the CVV open. At 512, air may flow from the atmosphere into the canister through the vent and a first amount of refueling vapors stored in the canister may be purged to the engine intake manifold. Thus, during the purging of the first amount of fuel vapors from the canister to the intake, no fuel vapors may be purged from the fuel tank to the canister. The first amount of purging may include an amount of fuel vapors (e.g., fuel mass), a duration of purging, and a rate of purging. As such, the CPV may be maintained open until the canister pressure, for example as estimated by the CPT, falls below a threshold ($threshold_2$), at 514, at which time the CPV may be closed at 516.

At 518, purging conditions of the fuel tank may be determined, for example, based on a fuel tank pressure (such as estimated by the FTPT) being above a threshold for purging ($threshold_3$). If the fuel tank pressure is below $threshold_3$, the fuel tank may not require purging and therefore the FTIV may be maintained in a closed position at 520 and the purging routine may end. If the fuel tank pressure is above $threshold_3$, the controller may command the FTIV to open at 522, and at 524 may bleed diurnal vapors, such as a second amount of fuel vapors, from the fuel tank through the vapor line into the canister. The second amount of purging may include an amount of fuel vapors (e.g., fuel mass), a duration of purging, and a rate of purging. The second amount may be based on the first amount purged from the canister. For example, as an amount and duration of purging of the first amount of fuel vapors from the canister increases, the second amount purged from the fuel tank may be increased. During the bleeding of diurnal vapors from the fuel tank, the canister pressure may be monitored and the FTIV may remain open (at 528) at least until the canister pressure reaches a threshold. At 526, it may be confirmed that the canister pressure is above a lower threshold but below an upper threshold (threshold$_4$). If the canister pressure is greater than or equal to threshold$_4$, the controller may command the FTIV to close at 530 and the purging routine may be completed.

In one example, the threshold pressure for purging the fuel tank may be based on the threshold pressure for purging the canister. For example, threshold$_4$ may be determined as a function of threshold$_2$ and may be less than threshold$_2$ to ensure that a first amount of fuel vapors, purged from the canister to the engine, is greater than a second amount of fuel vapors, bled from the fuel tank to the canister. This method of operation may curb pressure fluctuations in the fuel tank by relieving some pressure during purging operations, while limiting the amount and rate of fuel vapor flow to the engine intake manifold. Additionally, this method may change the pressure vs. temperature curve of the fuel tank during cool downs due to removal of fuel mass, affecting subsequent leak detection subroutines (described below) and diurnal vapor generation.

In this way, by limiting the amount and rate of fuel vapors that flow to the engine during purging, engine flooding may be prevented and variability in vehicle operation experienced by the vehicle operator may be reduced. In alternate embodiments, both fuel tank pressure and canister pressures may be monitored throughout the purging routine. Additionally, the FTIV may be opened concurrently with the CPV. In still other embodiments, the same threshold may be used for commanding both fuel tank purging and canister purging.

In one example, the vehicle may be a hybrid vehicle with an engine that is selectively operated in response to a battery state of charge. Thus, in one example, the vehicle may be operated with the engine-on, for example, due to the state of charge of the vehicle battery being below a threshold. During vehicle motion, a venturi coupled to the underside of the vehicle body may be configured to generate vacuum due to the flow of air there-through. The generated vacuum may be stored in a vacuum accumulator coupled to the venturi. Similarly, during vehicle operation, vacuum may be generated and stored in the venturi during brake application. For example, the venturi may be coupled to the outlet of a brake booster pump such that exhaust flow the brake booster pump may be flown through the venturi and advantageously used to generate a vacuum. The stored vacuum may be used at a later time, for example, during leak detection operations.

During the vehicle operation, a controller may keep the FTIV closed and the CPV closed to retain refueling fuel vapors in the canister and diurnal fuel vapors in the fuel tank. When purging conditions are met, for example, when a canister pressure exceeds a threshold due to storage of fuel vapors therein, the controller may open the CPV while keeping the FTIV closed, to thereby purge an amount of fuel vapors to the engine intake. After purging fuel vapors from the canister, that is, when the canister pressure has dropped below a threshold, the controller may then proceed to purge fuel vapors from the fuel tank to the canister and/or engine intake.

In one example, the controller may determine whether to purge the diurnal fuel vapors from the fuel tank to the canister and/the intake based on engine operating conditions, and/or a fuel tank pressure. For example, when the fuel tank pressure at the time of purging is above a threshold, the controller may determine that a larger amount of fuel vapors are to be purged from the fuel tank, and may accordingly open the FTIV while keeping the CPV open to thereby purge fuel vapors to the canister and further on to the engine intake. In another example, when the fuel tank pressure at the time of purging is below the threshold, the controller may determine that a smaller amount of fuel vapors are to be purged from the fuel tank, and may accordingly open the FTIV while closing the CPV to thereby purge fuel vapors to the canister and not to the engine intake. Once purging operations are completed, the controller may re-seal the fuel tank and canister by closing the FTIV and CPV to resume storing fuel vapors in the canister and retaining diurnal vapors in the fuel tank. In this way, purging of fuel vapors from the canister and the fuel tank may be coordinated.

In another example, during vehicle operation (that is, during an engine-on or engine-off mode), a refueling request may be received, such as due to a fuel level in the fuel tank falling below a threshold. As such, if the refueling request is received during a purging operation, the purging may be delayed for at least the duration of the refueling, to advantageously coordinate refueling operations with purging operations. To enable refueling, the engine controller may first turn the engine off, if it was previously turned on. A refueling door may be opened to enable a fuel pump nozzle to be inserted to receive fuel in the fuel tank. However, before opening a refueling valve coupled to the door, to ensure operator safety during refueling, the controller may verify that the fuel tank pressure is below a threshold. If the fuel tank pressure is above the threshold, the controller may open the FTIV to release the retained diurnals into the canister and delay opening of the fuel valve and refueling of the fuel tank until the fuel tank pressure falls below a threshold. In this way, safety during refueling operations may be enhanced.

If the vehicle is not running, then the controller may be configured to perform one or more leak detection routines for identifying the presence of leaks in the fuel vapor recovery system. Specifically, leaks may be identified by applying a vacuum and monitoring changes in fuel vapor recovery system pressure (such as fuel tank pressure and canister pressure). The vacuum applied for leak detection may be an engine-off natural vacuum created due to a previous engine operation, or may be applied by providing vacuum from the vacuum accumulator. In one example, where the leak is due to a degradation of a fuel vapor recovery system valve, such as the FTIV and/or the CPV, the controller may determine valve degradation by comparing changes in the fuel tank pressure and/or the canister pressure before and after the vacuum application.

To meet regulatory standards for fuel vapor recovery systems, the hybrid vehicle may include one or more leak detection subroutines. In one example, during a first condition, wherein the hybrid vehicle has been operated in the engine-on mode for an extended duration the vehicle temperature may be high, generating a high pressure in the fuel tank, greater than a predetermine threshold, such as threshold$_5$ of FIG. 6, which is sufficient for leak detection. In the first condition, in another example, the fuel tank pressure to be negative (a vacuum) as fuel stored in the fuel tank may have been consumed by the engine, such that the absolute value of the fuel tank pressure is greater than a predetermined threshold (such as threshold$_5$ of FIG. 6), and is sufficient for leak detection.

If a high pressure or vacuum is present in the fuel tank (greater than a threshold), the fuel tank pressurization may be advantageously used to test for leaks in the system and identify degradation of the fuel vapor recovery system components, such as the FTIV, the CPV, and/or the CVV, in a primary leak detection subroutine. For example, with the fuel tank sealed (by closing the FTIV and CPV) and pressurized, a rate of change or pressure in the sealed fuel tank may be monitored. As such, in the absence of leaks, the fuel tank pressure may be substantially constant, and may not fluctuate. Thus, in one example, the controller may determine degradation of one or more of the FTIV, the refueling valve, and/or the FTPT in a response to a rate of change of the fuel tank being greater than a threshold (such as $threshold_6$ of FIG. 6) due to one or more leaks in the valves of the fuel tank or malfunction of the fuel tank pressure sensor. If the pressure of the fuel tank did not substantially change, the FTIV may be commanded open such that air/fuel vapors are permitted to move through the vapor line, and the fuel tank pressure may be monitored again. As such, upon opening the FTIV, in the absence of leaks, the fuel tank pressure may be expected to decreases over time, for example decrease with a rate of change of fuel tank pressure greater than a threshold (such as $threshold_s$ of FIG. 6), due to the flow of vapors through the vapor line, If the rate of change of the fuel tank pressure is less than the threshold, the controller may determine that the FTIV is stuck in a closed position, and thus the FTIV is degraded.

As such, if the FTIV is functional, the canister pressure and the fuel tank pressure can be expected to generally reach equilibrium. For example, the fuel tank pressure may gradually decrease towards the canister pressure, while the canister pressure may gradually increase towards the fuel tank pressure. Thus in another example, the controller may determine degradation in one or more of the CPV, the CVV, and/or the CPT based on the rate of change of the canister pressure being greater than a threshold ($threshold_{10}$) after a predetermined duration of time has elapsed. Upon indication of degradation of any of the above mentioned fuel vapor recovery system components, the controller may set a diagnostic code.

Optionally, in another example, the controller may generate the first condition, such that a vacuum or pressure sufficient for leak detection is generated in the fuel tank. In one example, this may be accomplished by allowing the engine to run after the vehicle has stopped to generate vacuum in the fuel tank through fuel consumption, or pressure by increased vehicle temperature. In another example, the controller may delay emission leak check for a predetermined duration and monitor temperature change during the duration of the delay, until temperature change is greater than a predetermined threshold (such as $threshold_8$ of FIG. 7). The controller may then monitor fuel tank pressure and if corresponding change in pressure has not occurred with the change in temperature, degradation of one or more of the FTIV, the refueling valve, and/or the FTPT is determined by the controller. Each of these examples may allow for the primary leak detection subroutine to be implemented by the controller, as described above.

In yet another example, during a second condition, wherein the hybrid vehicle has been operated in the engine-off mode for an extended duration, the vehicle temperature may be close to ambient temperature and fuel consumption may be low. In this example, neither of a high pressure nor a vacuum are generated in the fuel tank and the fuel tank pressure may be less than a predetermine threshold (such as $threshold_5$ of FIG. 6), and is insufficient for leak detection.

If a high pressure or vacuum is not present in the fuel tank (less than a threshold), an external vacuum source, such as a vacuum accumulator, may be advantageously used to test for leaks in the system and identify degradation of the fuel vapor recovery system components, such as the FTIV, the CPV, and/or the CVV, in a secondary leak detection subroutine. The vacuum accumulator may obtain negative pressure/vacuum by one or more methods. For example, the vacuum accumulator may be coupled to the engine intake manifold such that negative pressure is stored while the vehicle is operated in the engine-on mode. As such, the presence of a vacuum may be dependent on engine-on operation time. Optionally, the controller may command the engine to run after the vehicle is shut off to increase engine-on time and increase the amount of vacuum stored in the vacuum accumulator. In another example, vacuum accumulation may be independent of engine-on time. As such, the vacuum accumulator may be coupled to a venturi located at a position on or within the vehicle that receives air flow, such as on the underside of the vehicle, or in the exhaust pathway of a brake booster pump. It may be appreciated that one or more of the above methods may be used to accumulate vacuum for use in the secondary leak detection subroutine.

As such, in the secondary leak detection subroutine, with the canister sealed (by closing the FTIV, CVV and CPV) and pressurized by applying a vacuum from the vacuum accumulator via opening of the VAV, a rate of change or pressure in the sealed canister may be monitored. Thereby in the absence of leaks, for example, the canister pressure may be substantially constant, and may not fluctuate. Thus, in one example, the controller may determine degradation of one or more of the FTIV, the CVV, the CPV, and/or the CPT in a response to a rate of change of the fuel tank being greater than a threshold (such as $threshold_{10}$ of FIG. 8) due to one or more leaks in the valves of the canister or malfunction of the canister pressure sensor. If the pressure of the canister did not substantially change, the FTIV may be commanded open such that air/fuel vapors are permitted to move through the vapor line, and the canister pressure may be monitored again. As such, upon opening the FTIV, in the absence of leaks, the canister pressure may be expected to increase over time, for example increase with a rate of change of canister pressure greater than a threshold (such as $threshold_{10}$ of FIG. 8), due to the flow of vapors through the vapor line. If the rate of change of the canister pressure is less than the threshold, the controller may determine that the FTIV is stuck in a closed position, and thus the FTIV is degraded.

As such, if the FTIV is functional, the canister pressure and the fuel tank pressure can be expected to generally reach equilibrium. For example, the fuel tank pressure may gradually decrease towards the canister pressure, while the canister pressure may gradually increase towards the fuel tank pressure. Thus in another example, the controller may determine degradation in one or more of the refueling vavle and/or the FTPT based on the rate of change of the fuel tank pressure being greater than a threshold ($threshold_6$) after a predetermined duration of time has elapsed. Upon indication of degradation of any of the above mentioned fuel vapor recovery system components, the controller may set a diagnostic code.

Figure 6:
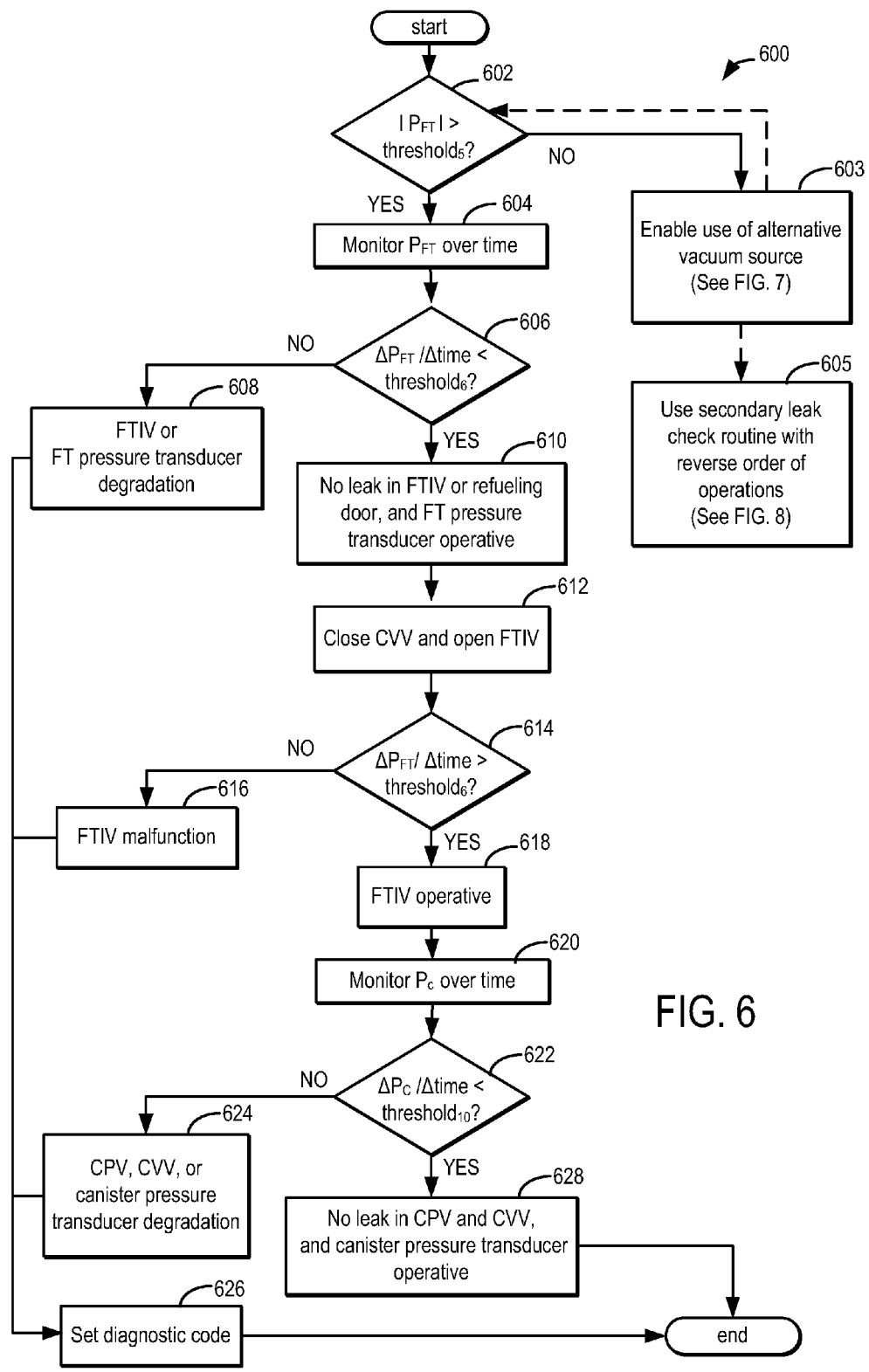
FIGS. 6-8 show high level flow charts for performing leak detection operations on the fuel vapor recovery system of FIG. 2.
Figure 7:
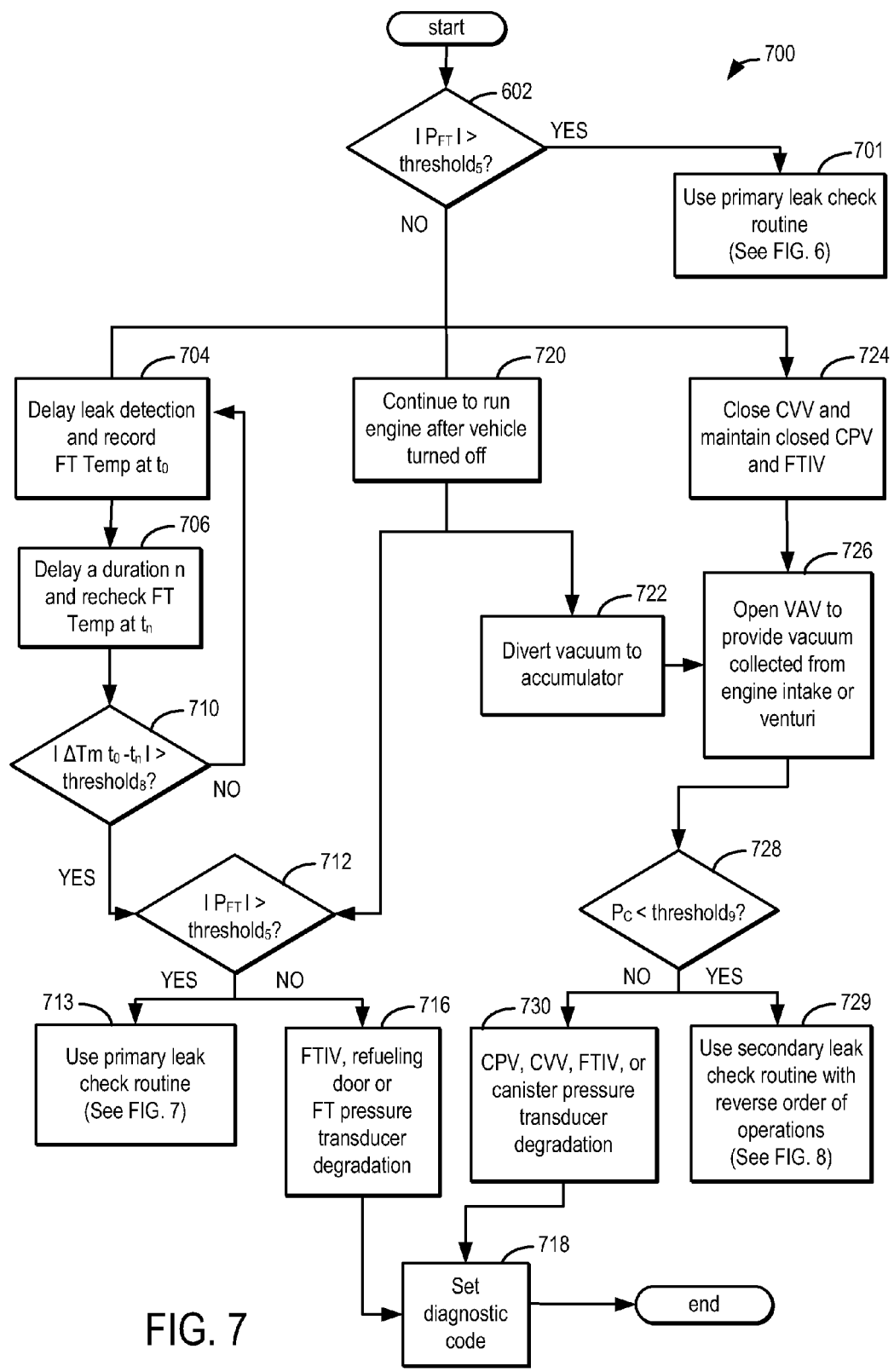
Figure 8:
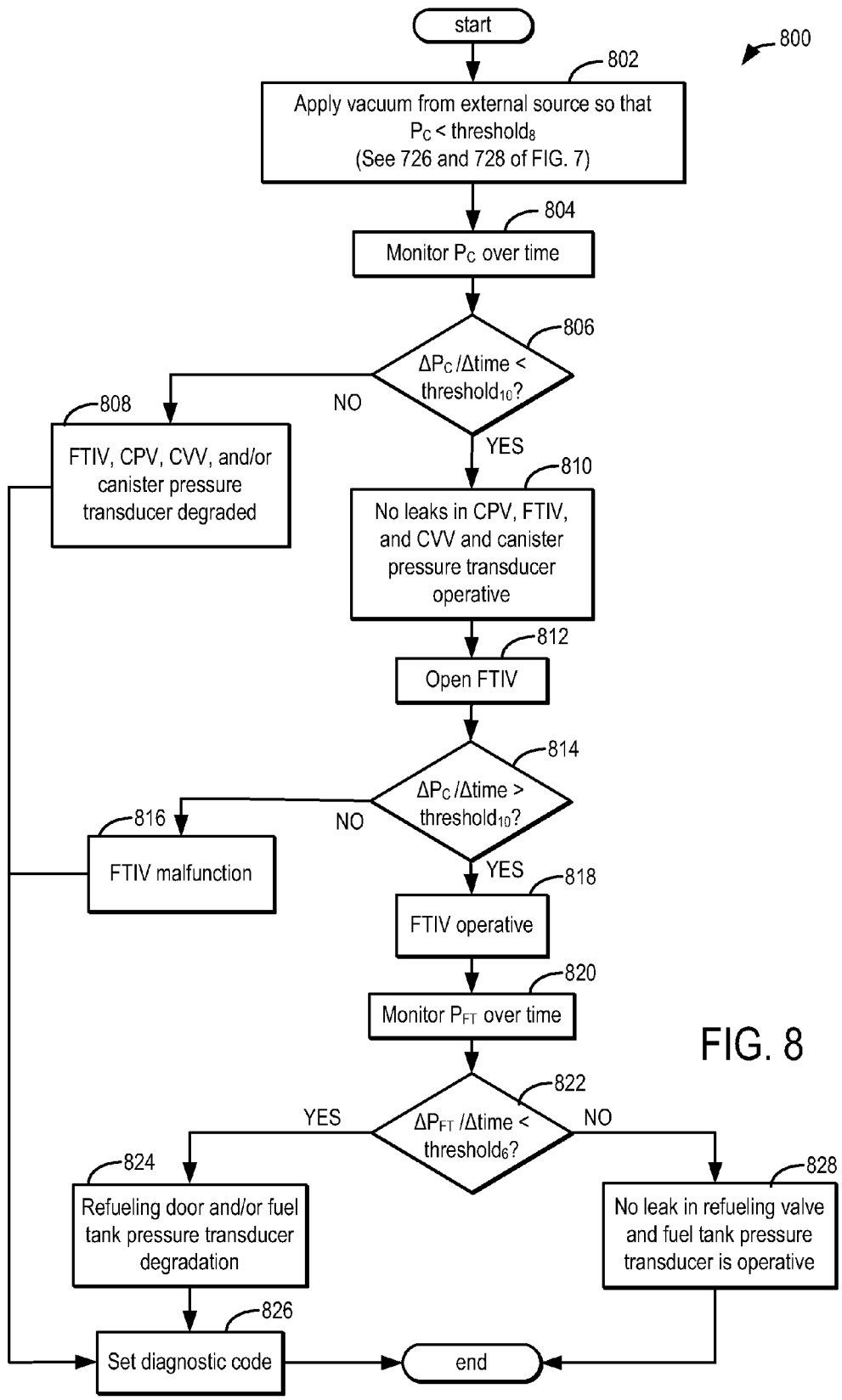

As discussed above, during leak detection, an order of detecting leaks in the components of the fuel vapor recovery system may be adjusted based on the availability of sufficient pressure and/or vacuum in the fuel tank (such as, an engine-off natural vacuum) or an amount of vacuum that may be supplied by the vacuum accumulator. Herein, two example leak detection routines are depicted in FIGS. 6-8. A primary leak detection routine 600 may use pressure or vacuum from the fuel tank to detect leaks in a first order of detection including first determining the presence of leaks in the fuel tank and then applying the pressure/vacuum from the fuel tank to the canister to determine the presence of leaks in the canister. A secondary leak detection subroutine 800 may detect leaks in a second, alternate, order of detection including using vacuum from an external source (such as the accumulator) applied to the canister to first determine the presence of leaks in the canister and then applying the vacuum to the fuel tank to determine the presence of leaks in the fuel tank. Various sources and methods may be used to apply a vacuum or pressure to the canister and/or the fuel tank, as elaborated in FIG. 8. Maps of example pressure and temperature signals that may be received by the controller during the leak detection routines of FIGS. 6-8 are shown in FIGS. 9-12.

Returning to FIG. 6, it shows a primary leak detection routine 600. Starting at 602, the controller may first estimate a fuel tank pressure (for example, based on a signal received from the FTPT) and determine if there is sufficient pressure or vacuum in the fuel tank to perform leak detection. In one example, sufficient pressure or vacuum may be determined based on an absolute value of the fuel tank pressure being greater than a predetermined threshold (threshold$_5$). Herein, the absolute fuel tank pressure may refer to an amount of positive pressure in the fuel tank, when the leak detection is performed by applying positive pressure, or may refer to an amount of vacuum in the fuel tank, when the leak detection is performed by applying a vacuum (that is, negative pressure).

Figure 10:
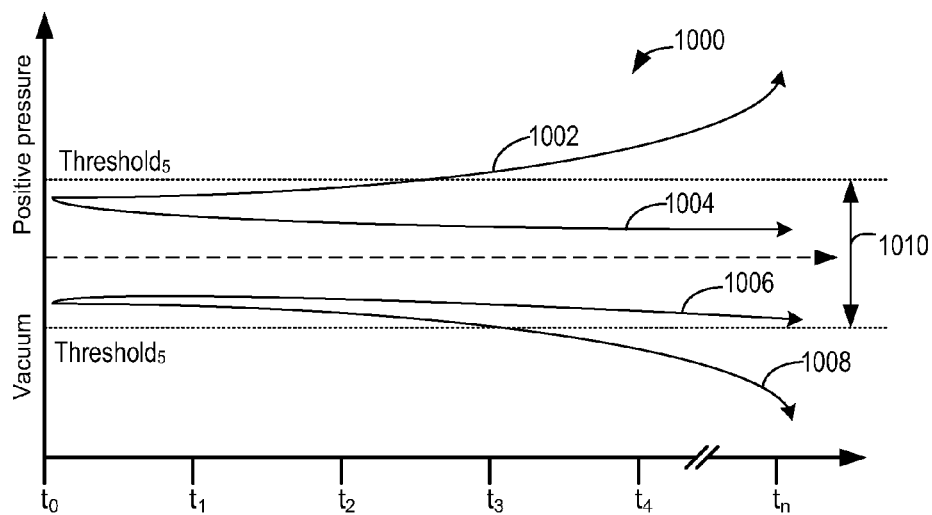

Map 1000 in FIG. 10 depicts example ranges of acceptable absolute fuel tank pressures and thresholds for leak detection based on whether the leak detection includes applying a positive pressure or a vacuum. Herein, threhold$_5$ extends equally in both directions of vacuum and positive pressure application (as shown by dotted-lines) on each side of the x-axis, depicted as range 1010. In alternate embodiments, different thresholds may be applied depending on whether a positive pressure or a vacuum is applied during leak detection.

Each of the curves 1002, 1004, 1006, and 1008 represent example fuel tank pressures. In the present embodiment, the absolute fuel tank pressure signal may be monitored and not a rate of change of fuel tank pressure. The controller may take detect the absolute pressure signal at various points in time, such as $t_0$, $t_1$, $t_2$, $t_3$, $t_4$, or $t_n$. Based on the absolute fuel tank pressure determined at a time when leak detection is requested, the controller may determine whether to perform the primary leak detection routine, including detecting leaks in the fuel tank before detecting leaks in the canister, or whether to perform the secondary leak detection routine, including detecting leaks in the fuel tank after detecting leaks in the canister. In this example, a signal detected at $t_n$ is further described, wherein $t_n$ is the time at which the controller receives an indication for leak detection may be enabled, such as shutting off of the vehicle and/or time elapsed since last leak detection event.

In one example, at 602, the absolute fuel tank pressure estimated at $t_n$ may be a positive pressure that is less than threshold$_5$ (as shown in curve 1004) or a vacuum that is greater than threshold$_5$ (as shown in curve 1006). In response to insufficient absolute pressure in the fuel tank estimated at 602, the primary leak detection routine 600 may be disabled by the controller at 603, and vacuum may be applied from one or more alternative pressure and vacuum sources by enabling vacuum application routine 700 (shown in FIG. 7). If sufficient, vacuum is generated in the fuel tank in routine 700, 603 may loop back to the start of the primary leak detection routine 600, starting at 602. Alternatively, at 605, a secondary leak detection routine with an alternate order of leak detection (as elaborated in FIG. 8), may be enabled. In comparison, if the absolute fuel tank pressure estimated at 602 is a positive pressure that is greater than threshold$_5$ (as shown in curve 1002) or a vacuum that is less than threshold$_5$ (as shown in curve 1008), then in response to sufficient absolute pressure in the fuel tank, the primary leak detection routine may be continued.

Returning to FIG. 6, if sufficient pressure/vacuum is detected in the fuel tank, at 604, the fuel tank pressure may be monitored over time. That is, a change in fuel tank pressure over time (or a rate of change of fuel tank pressure) may be monitored. At 606, it may be determined whether the change in fuel tank pressure over time is less than a threshold (threshold$_6$). As such, since the fuel tank remains sealed during leak detection, a change in fuel tank pressure over time may be indicative of a leak at the fuel tank isolation valve (due to FTIV degradation) and/or degradation of the FTPT. Thus, if the change in fuel tank pressure over time is more than the threshold, at 608 FTIV degradation may be determined and at 626, a diagnostic code may be set. If the change in fuel tank pressure over time is less than the threshold, then at 610, the controller may determine that no leaks are present, and that the valves are not degraded.

Figure 9:
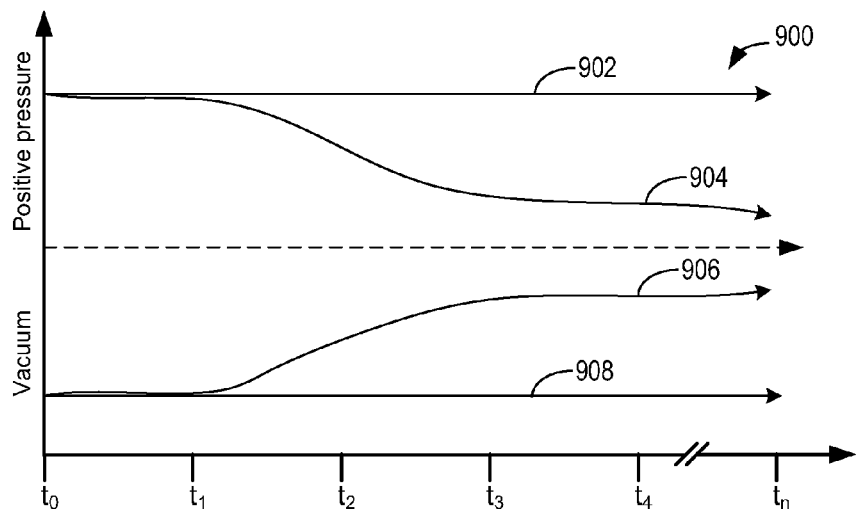
FIGS. 9-11 show maps depicting example fuel tank and/or canister pressures which may occur during leak detection operations.

Examples of changes in fuel tank pressure over time are shown in map 900 of FIG. 9. Herein, the controller monitors changes in fuel tank pressure (by receiving signals from the FTPT) beginning at $t_0$ and continuing for a predetermined duration, herein to $t_n$. Line 904 depicts a fuel tank positive pressure that decreases over time and line 906 depicts a fuel tank vacuum that increases over time. In this example, each of lines 904 and 906 indicate the presence of leaks due to a change in fuel tank pressure over time that is greater than a threshold. In comparison, line 902 shows a fuel tank positive pressure and line 908 shows a fuel tank vacuum that change over time at a rate lower than the threshold. Herein, each of lines 902 and 908 may indicate that there are no leaks in the system and that the valves of the fuel vapor recovery system are not degraded.

Returning to FIG. 6, after it is determined that no leaks are present in the fuel tank and the FTPT is operative, the controller may close the CVV and open the FTIV at 612, thereby sealing the canister from the atmosphere and applying the pressure or vacuum from the fuel tank to the canister by allowing flow of air and fuel vapors through the vapor line. The CPV may be maintained in a closed position, as no purging operations may occur when the vehicle is off (see FIG. 3). At 614, a change in absolute fuel tank pressure over time may again be monitored by the controller by receiving signals from the FTPT, and it may be determined if the rate of change of absolute fuel tank pressure is greater than a threshold (threhsold$_7$). Herein, in the absence of leaks, after opening the FTIV, the flow of fuel vapors from the fuel tank to the canister may be expected to cause the fuel tank pressure to change. Thus, if the change in fuel tank pressure over time is below the threshold, then at 616, the controller may determine that a leak is present, and that the FTIV is degraded (e.g. is inoperative) and may set a diagnostic code at 626. However, if the change in fuel tank pressure over time is greater than threshold, then at 618 the controller may determine that the FTIV is not degraded.

At 620, the controller may then monitor the canister pressure over time through signals from the CPT beginning at $t_0$ and continuing for a predetermined duration (such as, to $t_n$), and a rate of canister pressure change is determined at 622. For example, it may be determined if the canister is able to hold pressure or vacuum over time after the fuel tank and the canister have equalized. At 628, the controller may determine that there is no leak in the canister based on a rate of change in canister pressure over time being less than a threshold (threshold$_{10}$). In one example, no leaks may be determined in the system as the change in canister pressure is less than thershold$_{10}$, such as sample pressures line 902 and line 908 of FIG. 9. In comparison, at 624, leaks may be determined in response to the change in canister pressure over time being greater than a threshold$_{10}$, such as sample pressure readings line 904 and line 906 of FIG. 9. The controller may determine the presence of a leak in the canister, degradation of a canister purge valve, or CPT degradation, and set a diagnostic code at 626.

If at 602 the absolute value of fuel tank pressure is less than threshold$_5$, such as sample pressure readings line 1004 and line 1006 of FIG. 10, then one or more alternate pressure/vacuum generation routines may be implemented by the controller, as now explained with reference to FIG. 7. One or more of the various vacuum generating strategies described herein may be either operated at different times, or concurrently. In one example, when the first vacuum generating strategy is performed and a fuel tank temperature is measured, the second and third strategies may be disabled. In another example, when engine operation is continued in the second strategy, engine vacuum may be stored in the accumulator and applied for leak detection, as in the third strategy. However, in alternate embodiments, only one of the engine vacuum (directly from the engine) or vacuum from the accumulator may be enabled for leak detection. That is, when engine operation is continued in the second strategy, the vacuum accumulator may be closed and the third strategy may be disabled.

In a first strategy, at 704, leak detection may be delayed and a fuel tank temperature, such as from a fuel tank temperature sensor, may be recorded at $t_0$. After a predetermined duration of time, $t_n$, has elapsed, the fuel tank temperature may again be recorded and the controller may determine if the temperature has heated or cooled sufficiently to generate a pressure change in the fuel tank. This is represented in 710 as the absolute value of the change in temperature between $t_0$ and $t_n$ being greater than a threshold (threshold$_8$). In one example, threshold$_8$ may be related to threshold$_5$, such that the temperature change corresponds to an amount of pressure/vacuum that is sufficient for leak detection.

Figure 12:
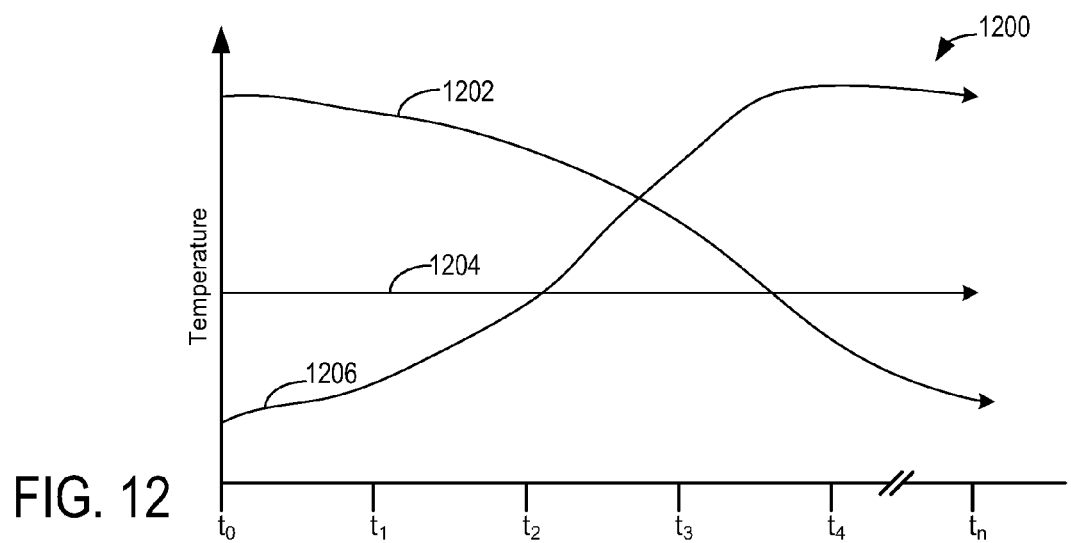
FIG. 12 shows a map depicting example changes in fuel tank temperature which may occur during leak detection operations.

Example fuel tank temperature readings, as received from fuel tank temperature sensor, are shown in map 1200 of FIG. 12. Herein line 1202 demonstrates a change from a relatively higher temperature to a relatively cooler temperature, thereby decreasing a pressure in the fuel tank; while line 1206 demonstrates a relatively cooler temperature changing to a relatively warmer temperature, thereby increasing a pressure in the fuel tank. Each of lines 1202 and 1206 show a temperature change greater than the threshold, thereby indicating to the controller that a corresponding, sufficient amount of pressure change, has occurred. In comparison, line 1204, which is generally flat, represents a temperature change that is less than the threshold, thereby indicating that a sufficient pressure change has not occurred.

Returning to FIG. 7, if the change in temperature (and thus a corresponding change in pressure) at 710 is not greater than the threshold, the routine may return to 704 and continue to delay the leak. However, if the temperature change is greater than the threshold, at 712 (as in 602), the controller may then determine if the absolute value of the fuel tank pressure is greater than a threshold (threshold$_5$). In one example, at 716, when the absolute fuel tank pressure remains below threshold$_5$, in response to no pressure change in conjunction with a temperature change, the controller may determine that leaks are present in the system. For example, it may be determined that leaks are present in the FTIV, or CPV, or that the FTPT is degraded. Accordingly, at 718, a diagnostic code may be set.

If the absolute pressure of the fuel tank is greater than threshold$_5$ at 712, then at 813, the primary leak detection routine (FIG. 6) may be resumed.

In a second vacuum generating strategy, beginning at 724, the controller may close the CVV and maintain the closed position of the CPV and FTIV, such that the canister side of the circuit is sealed. Vacuum from a vacuum accumulator is then applied to the canister by opening the VAV at 726. The vacuum accumulator may acquire vacuum from one or more of the engine intake, an ambient air stream, or the brake booster exhaust pathway. At 728, the controller may determine if the canister pressure is less than a threshold, threhsold$_9$, by receiving a signal from the CPT. In one example at 729, wherein the canister pressure is less than threshold$_9$, a secondary leak detection routine (FIG. 8) may be enabled. If the canister pressure is greater than a threshold$_9$ upon application of a vacuum, at 730, the controller may determine that one or more of the canister valves, or FTIV, or CPT are degraded.

Figure 11:
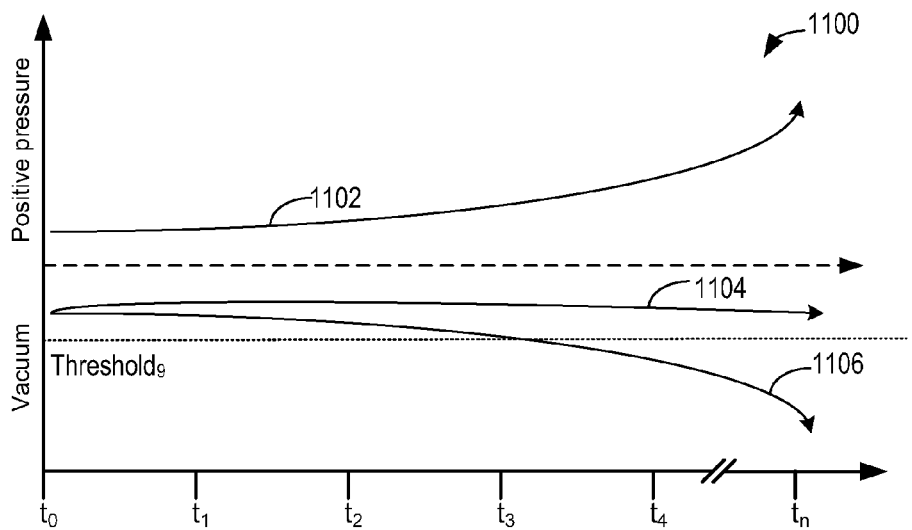

Example changes in canister pressure, as received from the CPT, are shown in map 1100 of FIG. 11. Herein, the dotted-line represents threshold$_9$. In the present embodiment, the canister pressure is detected at various points in time, such as $t_0, t_1, t_2, t_3, t_4,$ or $t_n$. For this example, a signal detected at $t_n$ is further described, wherein $t_n$ is the time at which other signals are received by the controller indicating that leak detection may be enabled, such as time elapsed since opening of the VAV.

At $t_n$, example CPT reading shown in line 1102 may be a positive pressure that is greater than threshold$_9$ and example CPT reading shown in line 1104 may be a vacuum that is greater than threshold$_9$. If at the time that a vacuum is applied on the canister, the canister pressure is greater than the threshold, as shown in line 1102 and line 1104, the secondary leak detection routine 800 (FIG. 8) may be disabled by the controller and a diagnostic code may be set to report degradation of one or more the canister valves and/or the CPT. In comparison, if at $t_n$, the canister pressure shows that a canister vacuum is less than threshold$_9$, as shown in line 1106, the secondary leak detection routine 800 (FIG. 8) may be enabled by the controller.

Returning to FIG. 7, in a third vacuum generating strategy, beginning at 720, the engine may be run for a duration (such as a short duration) after the vehicle is shut off. The duration of the continued engine operation may correspond to a length of time required to generate sufficient pressure/vacuum, for example, a duration required to bring the absolute pressure in the fuel tank above a threshold (such as threshold$_5$). If the engine is run after the vehicle is shut off and absolute fuel tank pressure is less than threshold$_5$ (at 712), then at 716, the controller may determine that a leak is present in the fuel tank (e.g., due to FTIV degradation) and may set a diagnostic code at 718. If the absolute value of fuel tank pressure is greater than threshold$_5$ at 712, the controller may initiate primary leak detection routine 600.

Optionally, alternative to generating a vacuum in the fuel tank, the continued engine operation at 720 may be used to store vacuum in a vacuum accumulator, as in 722. In this case, the vacuum accumulator may be coupled to the engine intake and vacuum may be applied to the canister by opening of the VAV, as in 726. The routine may then return to the second vacuum generating strategy (as previously elaborated at 728-730). If sufficient vacuum is present in the canister (that is, canister pressure is less than threshold$_9$), then at 729, the secondary leak detection routine 800 may be implemented by the controller, as shown in FIG. 8.

Now turning to FIG. 8, a secondary leak detection routine is depicted that may be enabled in response to insufficient fuel tank pressure or vacuum for performing the primary leak detection routine. In the secondary routine, the canister may be checked for leaks before confirming operation of the FTIV, and detecting leaks in the fuel tank. Specifically, a vacuum may be applied from a source other than engine-off natural vacuum, such as the vacuum generated in FIG. 7, and leak detection may be enabled in the canister before detecting leaks in the fuel tank.

At 802, a vacuum is applied to the canister from a vacuum accumulator such that the canister pressure is less than threshold$_9$ (as previously shown at 726 and 728 of FIG. 7). Once sufficient vacuum has been detected in the canister, at 804, canister pressure is monitored over time. At 806, it may be confirmed whether the change in canister pressure over time is less than a threshold (threshold$_{10}$). As the canister may remain sealed during leak detection, a change in canister pressure over time being greater than a threshold at 806 may be indicative of a leak, for example, at one more of the canister valves and/or degradation of the CPT (at 808), and a diagnostic code may be set by the controller at 826. A sample pressure reading indicating a leak may be represented by line 906 of FIG. 9. If the change in canister pressure over time is less than the threshold at 806, then at 810, the controller may determine that the valves of the canister have no leaks and the CPT is operative. A sample pressure reading indicating that no leak is present may be represented by line 908 of FIG. 9.

After it is determined that no leaks are present in the canister and the CPT is operative, the controller may open the FTIV at 812, thereby applying the vacuum from the canister to the fuel tank by allowing flow of air and fuel vapors through the vapor line. The CPV may be maintained in a closed position, as no purging operations may occur when the vehicle is off (see FIG. 3). At 814, a change in canister pressure over time may again be monitored by the controller. If the change in canister pressure over time is less than a threshold, the controller may determine that the FTIV is inoperative (e.g., is stuck closed) at 816, and may set a diagnostic code at 826. However, if a change in canister pressure over time is greater than the threshold$_{10}$, then at 818, the controller may determine that the FTIV is operative (e.g., is not stuck open), as in 818. In this case, line 908 of FIG. 9 may show no change over time and may indicate malfunction of the FTIV, while line 906 may show change in pressure over time and may indicate that the FTIV is operative.

At 820, the controller may monitor the fuel tank pressure over time, for example, through signals from the FTPT, beginning at $t_0$ and continuing for a predetermined duration to $t_n$. The change in fuel tank pressure over time may be determined to be greater or less than a threshold (threshold$_6$) at 822. At 828, it may be determined by the controller that there is no leak if the change in fuel tank pressure over time is less than threshold$_6$. Specifically, a fuel tank pressure reading showing little or no change over time indicates that there are no leaks present in the fuel tank, such as line 908 of FIG. 9. In comparison, a fuel tank pressure reading showing change over time indicates that there may be a leak present in the fuel tank, such as line 906 of FIG. 9. Accordingly, the controller may determine the presence of leaks at 824 and set a diagnostic code at 826, respectively. After diagnostic codes indicating leaks are set by the controller, secondary leak detection subroutine 800 may be ended.

In this way, leak detection routines may be adjusted based on the availability of sufficient amount of pressure or vacuum for the leak detection. Further, purging operations may be coordinated with refueling operations and leak detection operations, thereby improving fuel vapor management, particularly in hybrid vehicles.

It will further be appreciated that the configurations and routines disclosed herein are exemplary in nature, and that these specific embodiments are not to be considered in a limiting sense, because numerous variations are possible. For example, the above diagnostic routines may be decoupled such that leak detection of the fuel tank and the canister are performed as distinct operations. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel vapor recovery system including a fuel tank and a canister, comprising,
    purging a first amount of fuel vapors from the canister to an engine intake while isolating the canister from the tank; and
    after purging the first amount, purging a second amount of fuel vapors from the tank to the canister while isolating the canister from the intake, the second amount adjusted based on the first amount.

2. The method of claim 1, wherein the purging is during a condition that includes a canister pressure being greater than a first threshold.

3. The method of claim 2, wherein the fuel tank is coupled to the canister through a first valve, and the canister is coupled to the engine intake through a second valve, and wherein purging the first amount includes maintaining the first valve closed to isolate the fuel tank from the canister while opening the second valve to couple the canister to the engine intake.

4. The method of claim 3, wherein purging the second amount includes opening the first valve to couple the fuel tank to the canister.

5. The method of claim 4, wherein during purging of the second amount, opening of the first valve is adjusted based on at least one of a canister pressure and a fuel tank pressure.

6. The method of claim 5, wherein the adjustment of the first valve includes opening the first valve when at least one of the canister pressure is lower than the first threshold and the fuel tank pressure is greater than a second threshold.

7. The method of claim 6, wherein the fuel tank pressure is estimated by a first pressure sensor coupled to the fuel tank, and wherein the canister pressure is estimated by a second pressure sensor coupled to the canister.

8. The method of claim 7, further comprising, after purging the second amount, closing the first valve.

9. The method of claim 8, wherein completion of refueling is indicated by at least one of a fuel tank pressure exceeding a threshold, a refueling door sensor indicating a refueling door being closed, and a fuel level sensor exceeding a threshold, and wherein purging of the first or second amount is initiated in response to the completion of refueling.

10. The method of claim 1, further comprising, in response to a request for refueling, delaying purging of the first amount and the second amount at least until refueling is completed.

11. A vehicle system, comprising,
a battery;
an engine including an engine intake, the engine selectively started and stopped responsive to a battery state of charge;
a fuel system comprising,
   a fuel tank with a first opening for receiving fuel and a second opening for delivering fuel vapors along a first conduit;
   a canister with a first opening for receiving air from an atmosphere, a second opening for receiving fuel vapors from the fuel tank along the first conduit, and a third opening for relaying stored fuel vapors to the engine intake along a second conduit;
   a vacuum accumulator including a venturi, the vacuum accumulator coupled to the canister along the second conduit through a vacuum accumulator valve;
   a fuel tank isolation valve, positioned in the first conduit, coupling the fuel tank to the canister;
   a canister purge valve, positioned in the second conduit, coupling the canister to the engine intake;
   a canister vent valve coupled to the first opening of the canister,
   a first pressure sensor in the first conduit for estimating a fuel tank pressure;
   a second pressure sensor in the second conduit for estimating a canister pressure; and
   a control system with computer readable instructions for, during a purging condition, when the canister pressure is greater than a threshold,
      isolating the fuel tank while purging a first amount of fuel vapors from the canister to the engine intake;
      after purging the first amount of fuel vapors, coupling the fuel tank while isolating the canister from the intake and purging a second amount of fuel vapors from the fuel tank, the second amount adjusted based on the first amount; and
      after purging the second amount, isolating the fuel tank.

12. The system of claim 11, wherein isolating the fuel tank includes closing the fuel tank isolation valve and coupling the fuel tank includes opening the fuel tank isolation valve.

13. The system of claim 12, wherein purging the first amount includes opening the canister purge valve and the canister vent valve.

14. The system of claim 13, wherein purging the second amount includes closing the canister purge valve and the canister vent valve to purge fuel vapors to the canister when the fuel tank pressure is below a threshold, and opening the canister purge valve and the canister vent valve to purge fuel vapors to the engine intake when the fuel tank pressure is above the threshold.

15. The system of claim 11, wherein the control system further includes instructions for, in response to a request for refueling, delaying purging until refueling is completed.

16. The system of claim 15, wherein refueling includes, opening a fuel tank door and receiving fuel in the fuel tank after the fuel tank pressure has dropped below a threshold.

17. The system of claim 16, wherein a completion of refueling is indicated by at least one of the fuel tank pressure exceeding the threshold, a fuel door sensor indicating a refueling door is closed, and a fuel level sensor exceeding a threshold.

18. The system of claim 11, wherein the purging condition includes the engine being in an engine-on mode of operation, and a canister pressure being greater than a threshold.

19. A vehicle fuel vapor recovery system, comprising,
a fuel tank coupled to a canister through a fuel tank isolation valve, the fuel tank configured to receive fuel through a refueling door;
a canister, configured to store fuel vapors, coupled to an engine intake through a canister purge valve, the canister further coupled to a vacuum accumulator;
a first pressure sensor coupled to the fuel tank to estimate a fuel tank pressure;
a second pressure sensor coupled to the canister to estimate a canister pressure; and
a control system with computer readable instructions for, during an engine-on mode of operation,
   opening the canister purge valve while closing the fuel tank isolation valve to purge a first amount of stored fuel vapors to the engine intake when the canister pressure is greater than a threshold;
   after purging the first amount of stored fuel vapors, opening the fuel tank isolation valve while closing the canister purge valve to purge a second amount of fuel vapors to the canister when the fuel tank pressure is greater than a first threshold; and
   after purging the first amount of stored fuel vapors, opening the fuel tank isolation valve while maintaining the canister purge valve open to purge the second amount of fuel vapors to the engine intake when the fuel tank pressure is greater than a second threshold higher than the first threshold.

20. The system of claim 19, wherein the control system further includes instructions for, in response to a request for refueling, delaying purging until refueling is completed, a completion of refueling indicated by a closing of a refueling door.

21. The system of claim 20, wherein a duration of delaying is adjusted based on a fuel level in the fuel tank and/or a fuel tank pressure after refueling, including delaying purging for a longer duration as the fuel level and/or the fuel tank pressure increase during refueling.

* * * * *